(12) United States Patent
Depraete

(10) Patent No.: US 10,234,007 B2
(45) Date of Patent: Mar. 19, 2019

(54) HYDROKINETIC TORQUE COUPLING DEVICE FOR MOTOR VEHICLE

(71) Applicant: VALEO EMBRAYAGES, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 282 days.

(21) Appl. No.: 15/161,896

(22) Filed: May 23, 2016

(65) Prior Publication Data
US 2017/0335936 A1    Nov. 23, 2017

(51) Int. Cl.
*F16H 45/02*    (2006.01)
*F16F 15/123*    (2006.01)

(52) U.S. Cl.
CPC ....... *F16H 45/02* (2013.01); *F16F 15/12366* (2013.01); *F16H 2045/0231* (2013.01)

(58) Field of Classification Search
CPC ................................. F16H 41/04; F16H 41/24
USPC .......................................................... 60/366
See application file for complete search history.

(56) References Cited

U.S. PATENT DOCUMENTS

| | | |
|---|---|---|
| 2,130,895 A | 9/1938 | Ness |
| 2,551,718 A | 5/1951 | Auten |
| 2,860,747 A | 11/1958 | Kelley |
| 2,992,713 A | 7/1961 | Stump et al. |
| 3,041,892 A | 7/1962 | Schjolin |
| 3,252,352 A | 5/1966 | General et al. |
| 4,041,701 A | 8/1977 | Goto et al. |
| 4,145,936 A | 3/1979 | Vincent et al. |
| 5,697,261 A | 12/1997 | Mokdad et al. |
| 5,713,442 A | 2/1998 | Murata et al. |
| 5,813,505 A | 9/1998 | Olsen et al. |
| 5,893,355 A | 4/1999 | Glover et al. |
| 6,026,940 A | 2/2000 | Sudau |
| 6,915,886 B2 | 7/2005 | Dacho et al. |
| 7,191,879 B2 | 3/2007 | Arhab et al. |
| 7,445,099 B2 | 11/2008 | Maucher et al. |

(Continued)

FOREIGN PATENT DOCUMENTS

| | | |
|---|---|---|
| DE | 1550957 A1 | 7/1969 |
| DE | 2245901 A1 | 4/1974 |

(Continued)

OTHER PUBLICATIONS

Lindemann et al., "iTC—Innovative Solutions for Torque Converters Pave the Way into the Future", Torque Converter, Schaeffler Symposium book 2014, pp. 280-301, Schaeffler Technologies AG & Co. KG.

*Primary Examiner* — F Daniel Lopez
*Assistant Examiner* — Daniel S Collins
(74) *Attorney, Agent, or Firm* — Berenato & White, LLC

(57) ABSTRACT

A hydrokinetic torque coupling device comprising an impeller wheel (2) able to hydrokinetically drive a turbine wheel (3) into rotation, with the impeller wheel (2) being rotationally coupled to a cover (5), with the turbine wheel (3) being able to be axially moved between an engaged position and a disengaged position, wherein it comprises an elastically deformable stress overtaking member (25) axially inserted between the turbine wheel (3) and a part (12) of the cover (5), with the stress overtaking member (25) being able to limit the axial displacement of the turbine wheel (3) towards the above-mentioned part (12) of the cover (5), opposite the turbine wheel (3).

16 Claims, 5 Drawing Sheets

(56) References Cited

U.S. PATENT DOCUMENTS

| | | |
|---|---|---|
| 8,276,723 B2 | 10/2012 | Verhoog et al. |
| 2003/0106763 A1 | 6/2003 | Kimura et al. |
| 2003/0168298 A1 | 9/2003 | Holler et al. |
| 2003/0168299 A1 | 9/2003 | Holler et al. |
| 2004/0011032 A1 | 1/2004 | Holler et al. |
| 2006/0086584 A1 | 4/2006 | Maucher et al. |
| 2013/0230385 A1 | 9/2013 | Lindemann et al. |
| 2014/0014454 A1 | 1/2014 | Davis |
| 2014/0014455 A1 | 1/2014 | Davis |
| 2014/0097055 A1 | 4/2014 | Lindemann et al. |
| 2014/0110207 A1 | 4/2014 | Davis |
| 2015/0021135 A1 | 1/2015 | Jameson |
| 2015/0027110 A1 | 1/2015 | Lindemann et al. |
| 2015/0037158 A1 | 2/2015 | Steinberger et al. |
| 2015/0068857 A1 | 3/2015 | Lindemann et al. |
| 2015/0362041 A1 | 12/2015 | Lee et al. |
| 2015/0369296 A1 | 12/2015 | Lopez-Perez |

FOREIGN PATENT DOCUMENTS

| | | |
|---|---|---|
| DE | 19729421 A1 | 1/1998 |
| DE | 19919449 A1 | 11/1999 |
| DE | 10226860 A1 | 12/2003 |
| DE | 102004024747 A1 | 12/2005 |
| EP | 0125428 A1 | 11/1984 |
| EP | 1048420 A2 | 11/2000 |
| EP | 1744074 | 1/2007 |
| FR | 668839 A | 11/1929 |
| FR | 2317556 A1 | 2/1977 |
| FR | 2339107 A1 | 8/1977 |
| FR | 2428188 A1 | 1/1980 |
| FR | 2493446 A1 | 5/1982 |
| FR | 2499182 A1 | 8/1982 |
| FR | 2561342 A1 | 9/1985 |
| FR | 2628804 A1 | 9/1989 |
| FR | 2714435 A1 | 6/1995 |
| FR | 2736982 A1 | 1/1997 |
| FR | 2787854 A1 | 6/2000 |
| FR | 2828543 A1 | 2/2003 |
| FR | 2938030 A1 | 5/2010 |
| FR | 3000155 A1 | 6/2014 |
| GB | 598811 | 2/1948 |
| GB | 1212042 A | 11/1970 |
| GB | 2235749 A | 3/1991 |
| GB | 2262795 A | 6/1993 |
| GB | 2283558 A | 5/1995 |
| GB | 2284875 A | 6/1995 |
| GB | 2468030 A | 8/2010 |
| JP | S58-131466 A | 8/1983 |
| JP | 09280317 A | 10/1997 |
| KR | 1013115310000 B1 | 9/2013 |
| WO | WO9914114 A1 | 3/1999 |
| WO | WO2004016968 A1 | 2/2004 |
| WO | WO2004018897 | 3/2004 |
| WO | WO2004046574 A1 | 6/2004 |
| WO | WO2011006264 A1 | 1/2011 |
| WO | WO2014128380 A1 | 8/2014 |

HYDROKINETIC TORQUE COUPLING DEVICE FOR MOTOR VEHICLE

FIELD OF THE INVENTION

The present invention relates to a hydrokinetic torque coupling device for a motor vehicle, such as a torque converter, for instance.

BACKGROUND OF THE INVENTION

The patent application US 2015/0021135 discloses a hydrodynamic torque converter comprising an impeller wheel intended to be coupled to a crankshaft and adapted to hydrokinetically rotate a turbine wheel, through a reactor. The impeller wheel is rotationally coupled to a cover wherein the impeller wheel, the turbine wheel and/or the damping means are at least partially accommodated. The turbine wheel is adapted to be axially moved between an engaged position in which the turbine wheel and the impeller wheel are axially moved closer to each other and rotationally coupled together, and a disengaged position in which the turbine wheel and the impeller wheel are axially moved away from each other and rotationally uncoupled.

The hydrodynamic torque coupling device further comprises a hub intended to be coupled to a transmission input shaft, connected to the turbine wheel through damping means.

The damping means comprise an annular wheel disc integral with the hub, two guiding washers axially positioned on either side of the annular wheel disc, and first elastic members acting on the circumference mounted between the annular wheel disc and the guiding washers. The first elastic members are adapted to act against the pivoting of the guiding washers relative to the annular wheel disc. The damping means further comprise second elastic members acting onto the circumference and mounted between a linking member attached to the turbine wheel and one of the guiding washers. The second elastic members are adapted to oppose the pivoting of the guiding washers relative to the turbine wheel.

In operation, in the disengaged position of the turbine wheel, the torque is transmitted from the crankshaft of the vehicle engine to the cover and to the impeller wheel, with such torque being then transmitted to the turbine wheel through the hydrokinetic coupling means formed by the impeller wheel, the turbine wheel and the reactor. The torque is then transmitted to the hub through the damping means.

When the turbine wheel is in the engaged position, the torque is directly transmitted from the cover and from the impeller wheel to the turbine wheel, without any action from the hydrokinetic coupling means. The torque is then transmitted to the hub through the damping means.

The turbine wheel moving between the engaged and disengaged positions thereof thus makes it possible to activate or deactivate the hydrokinetic coupling.

Additionally, the torque converter is adapted to operate in a so-called direct mode, wherein the torque is transmitted from the impeller wheel to the turbine wheel. More specifically, in the disengaged position of the turbine wheel, i.e. when the hydrokinetic coupling is activated, the impeller wheel turns faster than the turbine wheel. Conversely, in a so-called back operation, the turbine wheel can turn faster than the impeller wheel.

The back operation mode is used for instance when the motor brake is used or when the user suddenly takes his/her foot off the accelerator pedal.

In some operation cases, specifically in the back mode and when the hydrokinetic coupling is activated, the turbine wheel may be axially pushed back opposite the impeller wheel. It is important to limit such a motion of the turbine wheel so as to prevent a possible damage to the torque converter and to enable the motion of the turbine wheel to the engaged position thereof, if necessary.

In the torque converter disclosed in the patent application US 2015/0021135, the radially internal periphery of one of the guiding washers comprises a large rest area adapted to rest on a radial part of the cover, so as to limit the motion of the turbine wheel-damping means assembly.

In this embodiment, the turbine wheel indirectly axially rests on the radial part of the cover through a large number of parts. The accurate position of the turbine wheel is not easily controlled because of the dimension tolerance of each part belonging to the corresponding chain of dimensions.

Besides, the large area whereon the mentioned above guiding washer rests on the cover generates a significant frictional torque in operation.

SUMMARY OF THE INVENTION

The invention aims at providing a variant to the solution of the prior art, by offering a simple, efficient and economical solution to the above-mentioned problems.

For this purpose, it provides for a hydrokinetic torque coupling device for a motor vehicle, comprising an impeller wheel intended to be coupled to a crankshaft and adapted to hydrokinetically rotate a turbine wheel, with the impeller wheel being rotationally coupled to a cover at least partially accommodating the impeller wheel, the turbine wheel and the reactor, with the turbine wheel being adapted to be axially moved between an engaged position in which the turbine wheel and the impeller wheel are rotationally coupled together, and a disengaged position in which the turbine wheel and the impeller wheel are rotationally uncoupled, characterized in that it comprises a bracing member axially extending between the turbine wheel and a part of the cover, with the bracing member being adapted to limit the axial motion of the turbine wheel toward the above-mentioned part of the cover, opposite the turbine wheel.

The displacement of the turbine wheel can thus be limited through the direct or indirect resting on the stress overtaking member, with the number of parts between the turbine wheel and the cover being limited. The position of the turbine wheel relative to the cover can thus be accurately controlled.

The bracing member makes it possible to take over the axially-oriented forces, so as to limit the constraints exerted specifically onto the turbine wheel, and thus to increase the service life of the hydrokinetic coupling device. More particularly, such deformable member is able to generate an axial stress onto the turbine wheel, which depends on the axial compression of said deformable member.

Besides, the dimensions of the various friction zones can be adjusted, so as to reduce the torques generated by such friction. The materials used can of course also be chosen so as to reach this goal.

It should be noted that a hydrokinetic torque coupling device may be a torque converter when the hydrokinetic torque coupling means comprise an impeller wheel, a turbine wheel and a reactor, or may be a coupler when the hydrokinetic torque coupling means have no reactor.

The stress overtaking member may be mounted prestressed.

The impeller wheel and the turbine wheel may be positioned axially closer to each other in the engaged position and axially away from one another in the disengaged position.

The stress overtaking member may comprise at least one elastomeric part.

In an alternative solution, the stress overtaking member may be a deformable taper washer, of the Belleville washer type.

The hydrokinetic torque coupling device may comprise a hub intended to be coupled to a transmission input shaft, with the stress overtaking member being axially inserted between the turbine wheel and the hub or between the hub and the cover.

A support washer may be inserted between the hub and the cover or between the hub and the turbine wheel, respectively.

The support washer is made of a polymer material, for instance.

The stress overtaking member may comprise a central part made of an elastically deformable material, for example an elastomeric part, and two side parts axially positioned on either side of the central deformable part, with said parts of the stress overtaking member being rotationally coupled together.

One of the side parts may be made of metal, with the other part being made of a material having a low coefficient of friction, for instance a synthetic material. The metal part is thus supported by a part which the stress overtaking member is rotationally coupled with, for instance supported by the hub, with the part having a low coefficient of friction being supported by a part intended to pivot relative to the stress overtaking member, for instance supported by the turbine wheel.

In this case, the central part and the side parts may have an annular shape, with at least one of the side parts and the central part each comprising at least one annular protruding or respectively recessed zone, embedded, in a form-fitting manner, in an annular protruding or respectively recessed zone of the other part. Such a configuration reduces the amount of material.

The hub, the turbine wheel or the cover may comprise at least a coupling lug intended to be engaged into an opening or a notch in the stress overtaking member so as to rotationally couple said stress overtaking member, on the one hand, and the hub, the turbine wheel or the cover, on the other hand.

The hydrokinetic torque coupling device may comprise damping means mounted between the turbine wheel and the hub.

The damping means make it possible to filter the vibrations and the rotation acyclism.

More particularly, the damping means may comprise an annular wheel disc connected to the hub and a least one guiding washer connected to the turbine wheel, with at least a first elastic member acting on the circumference being mounted between the annular wheel disc and the guiding washer, with the first elastic member being adapted to oppose the rotation of the annular wheel disc relative to the guiding washer.

The damping means may comprise at least one second elastic member mounted between the guiding washer and the turbine wheel, with the second elastic member being adapted to oppose the relative rotation of the turbine wheel relative to the guiding washer.

The damping means are thus of the LTD (<<Long Travel Damper >>) type and enable a significant displacement on the circumference, so as to improve the filtering quality of the damping means.

The hydrokinetic torque coupling device may also comprise one or more of the following characteristics:
 the impeller wheel is adapted to hydrokinetically rotate a turbine wheel, through a reactor,
 the annular wheel disc and the hub are integral with each other and form a single part,
 the turbine wheel comprises a radially external peripheral area, with said area being intended to rest on and rub a matching area of the impeller wheel or of the cover, when the turbine wheel is in the engaged position, so as to frictionally couple the turbine wheel and the impeller wheel,
 said external peripheral area of the turbine wheel comprises friction linings.

BRIEF DESCRIPTION OF THE DRAWINGS

The invention will be better understood, and other details, characteristics and advantages of the invention will appear upon reading the following description given by way of a non-restrictive example while referring to the appended drawings wherein.

DETAILED DESCRIPTION OF THE PREFERRED EMBODIMENT(S)

Figure 1:
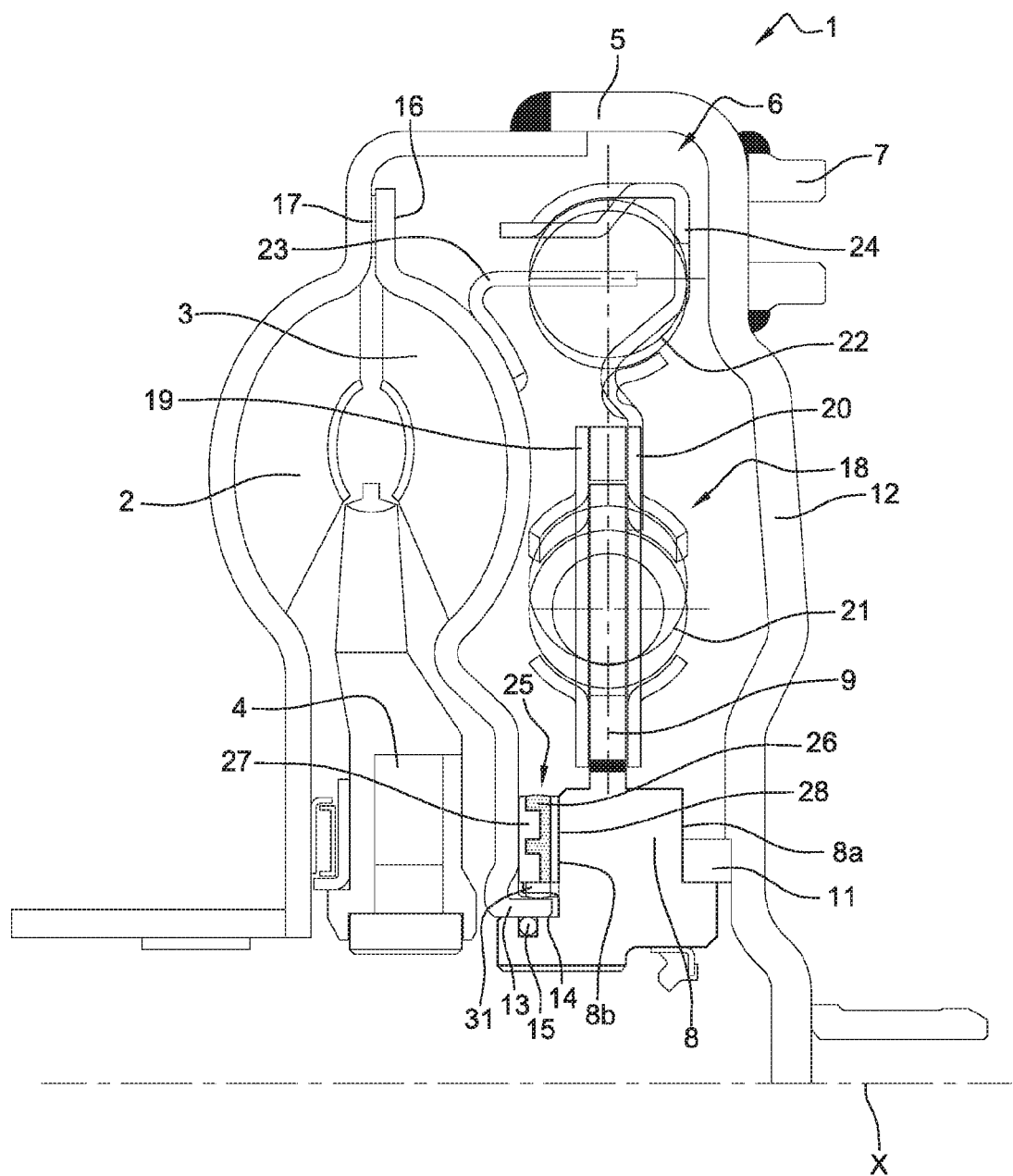
FIG. 1 is a half-sectional view along an axial plane, of a torque converter according to a first embodiment of the invention.
Figure 2:
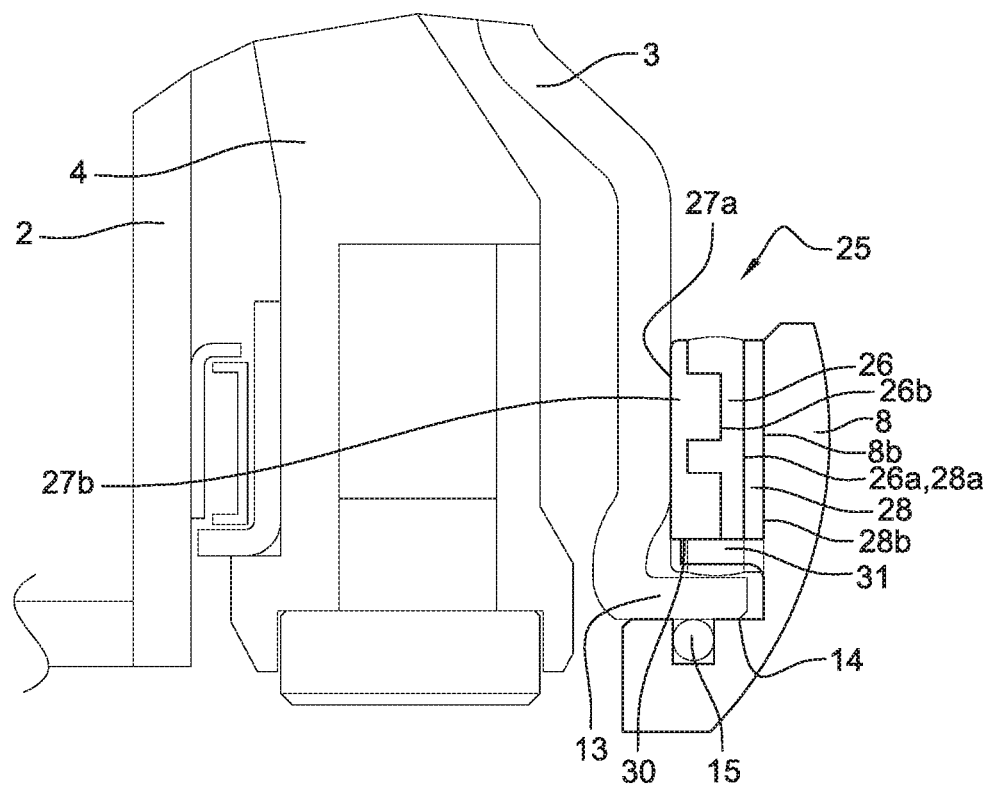
FIG. 2 is a detailed view of a part of FIG. 1.
Figure 3:
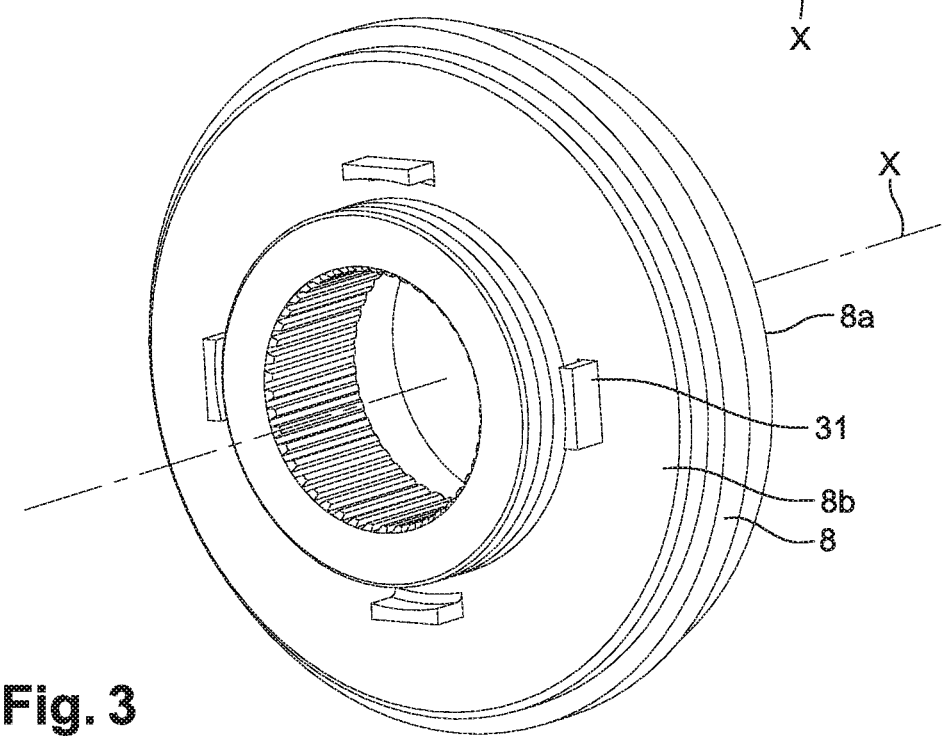
FIG. 3 is a perspective view of the hub.
Figure 4:
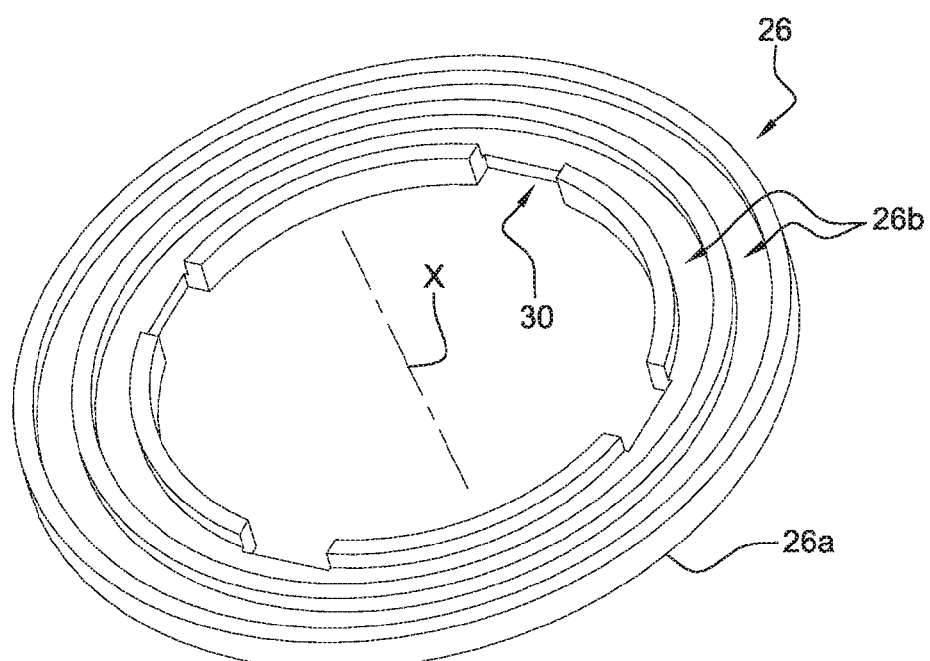
FIG. 4 is a perspective view of a part of the stress overtaking member.

A hydrokinetic torque coupling device according to a first embodiment of the invention is shown in FIGS. 1 to 5. The hydrokinetic torque coupling device is more particularly a hydrokinetic torque converter.

Such device makes it possible to transmit a torque from the output shaft of an internal combustion engine in a motor vehicle, such as for instance a crankshaft, to a transmission input shaft. The axis of the torque converter bears reference X.

In the following, the words "axial" and "radial" are defined relative to the X axis.

The torque converter 1 comprises an impeller bladed wheel 2, able to hydrokinetically drive a turbine bladed wheel 3 through a reactor 4.

The impeller wheel 2 is attached to a cover 5 by welding and defines with said cover 5 an internal volume 6 accommodating the impeller wheel 2, the turbine wheel 3 and the reactor 4. Said cover 5 comprises attaching means 7 making it possible to rotationally couple said cover 6 to the crankshaft.

The torque converter 1 further comprises a central hub 8, the radially internal periphery of which is ribbed, having an X axis and being accommodated in the internal volume 6. The central hub 8 comprises an annular wheel disc 9 which radially extends outwards. The central hub comprises a radial surface 8a facing forward, towards the turbine wheel 3 and a radial surface 8b facing backwards, towards the cover 5. A pad 11 adapted to limit friction and made of a synthetic material for instance, is inserted between the front end 10 of the hub 8 and a radial part 12 of the cover 5.

The turbine wheel 3 comprises a cylindrical rim 13 on the radially internal periphery thereof, mounted about a cylindrical part 14 formed at the back end of the hub 8. Said cylindrical part 14 comprises an O-ring 15 mounted in a groove of the hub 8. The turbine wheel 3 is adapted to axially move relative to said cylindrical part 14 of the hub 8.

The radially external periphery of the turbine wheel 3 comprises a radial area 16 fitted with friction lining 17 adapted to come to rest onto a radial area 18 of the impeller wheel 2.

The turbine wheel 3 is adapted to be axially moved between an engaged position in which the turbine wheel 3 and the impeller wheel 2 are axially moved closer to each other and rotationally coupled together, and a disengaged position in which the turbine wheel 3 and the impeller wheel 2 are axially moved away from each other and rotationally uncoupled.

The motion of the turbine wheel 3 is controlled by pressure chambers positioned on either side of the turbine wheel 3.

The turbine wheel 3 is rotationally coupled to the hub through a damping device 18.

The damping device 18 comprises comprises an annular wheel disc 9 integral with the hub 8, two guiding washers 19, 20 axially positioned on either side of the annular wheel disc 9, and first elastic members 21 acting on the circumference mounted between the annular wheel disc 9 and the guiding washers 19, 20. The first elastic members 21 are adapted to act against the pivoting of the guiding washers 19, 20 relative to the annular wheel disc 9. The damping device 18 further comprise second elastic members 22 acting on the circumference, mounted between a linking member 23 attached to the turbine wheel 3, for instance by welding, and the radially external periphery 24 of one of the guiding washers 19, 20, for instance the radially external periphery 24 of the guiding washer 20 opposite the turbine wheel 3. The second elastic members 22 are adapted to act against the pivoting of the guiding washers 19, 20 relative to the turbine wheel 3.

The first and second elastic members 21, 22 are for instance straight or curved coil compression springs.

In operation, in the disengaged position of the turbine wheel 3, the torque is transmitted from the crankshaft of the vehicle engine to the cover 5 and to the impeller wheel 2, with such torque being then transmitted to the turbine wheel 3 through the hydrokinetic coupling device formed by the impeller wheel 2, the turbine wheel 3 and the reactor 4. The torque is then transmitted to the hub 8 through the damping device 18.

When the turbine wheel 3 is in the engaged position, the torque is directly transmitted from the cover 5 and from the impeller wheel 2 to the turbine wheel 3, without any action from the hydrokinetic coupling device. The torque is then transmitted to the hub through the damping device 9, 19, 20, 21, 22.

The turbine wheel 3 moving between the engaged and disengaged positions thereof thus makes it possible to activate or deactivate the hydrokinetic coupling.

Additionally, the torque converter 1 is adapted to operate in a so-called direct mode, wherein the torque is transmitted from the impeller wheel 2 to the turbine wheel 3. More specifically, in the disengaged position of the turbine wheel 3, i.e. when the hydrokinetic coupling is activated, the impeller wheel 2 turns faster than the turbine wheel 3. Conversely, in a so-called back operation, the turbine wheel 3 can turn faster than the impeller wheel 2.

The back operation mode is used for instance when the motor brake is used or when the user suddenly takes his/her foot off the accelerator pedal.

In some operation cases, specifically in the back mode and when the hydrokinetic coupling is activated, the turbine wheel 3 may be axially pushed back opposite the impeller wheel 2. It is important to limit such a motion of the turbine wheel 3 so as to prevent a possible damage to the torque converter 1 and to enable the motion of the turbine wheel 3 to the engaged position thereof, if necessary.

For this purpose, the invention provides the mounting of a stress overtaking member 25 axially inserted between the impeller wheel 2, specifically the radially internal periphery of the impeller wheel 2 and the hub 8, more particularly the surface 8b of the hub 8. The bracing member 25 is adapted to limit the axial motion of the turbine wheel 3 towards the above-mentioned part 12 of the cover 5 opposite the impeller wheel 2.

Figure 5:
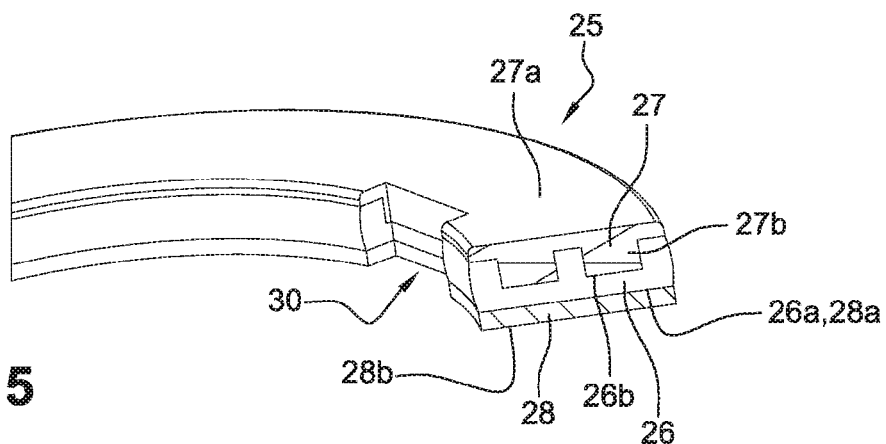
FIG. 5 is an axially sectional view of the stress overtaking member.

As can be best seen in FIG. 5, the stress overtaking member 25 comprises a central annular part 26 made of an elastically deformable material, and two side parts 27, 28 axially positioned on either side of the central deformable part 26. The part 28 is made of a metal material, for instance steel. The part 27 is made of a material having a low coefficient of friction, for instance a synthetic material.

The central part 26 comprises a flat radial surface 26a facing the hub and a radial surface facing the turbine wheel comprising two radially spaced recessed annular zones 26b.

The part 27 comprises a flat radial surface 27a resting on the radially internal periphery of the turbine wheel 3 and a radial surface comprising two protruding annular areas 27b engaged, in a form-fitting manner, into recessed annular areas 26b of the central part 26. The part 28 comprises two flat radial surfaces 28a, 28b, one 28a of which rests on the flat radial surface 26a of the central part 26 and the other one 28b rests on the surface 8b of the hub 8.

According to an alternative embodiment, the elastomeric central part 26 is overmolded onto the side part 27.

Figure 6:
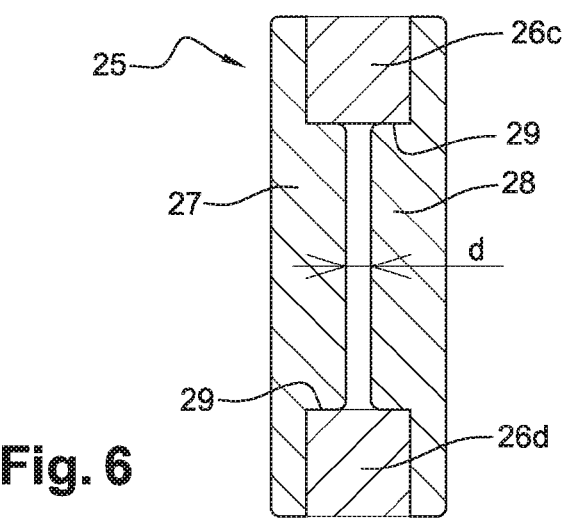
FIG. 6 is a view of a section of a stress overtaking member according to an alternative embodiment of the invention.

According to still another alternative embodiment shown in FIG. 6, the central part consists of two concentric rings 26c, 26d made of a deformable material, for instance elastomer, with each ring 26c, 26d having a rectangular or square section, for instance. Both rings 26c, 26d are mounted between two mutually symmetrical side parts 27, 28. Each ring 26c, 26d is mounted in shoulders or recesses 29 having shapes matching the side parts 27, 28 positioned one facing the other. One 26d of the rings is positioned on the radially internal periphery of the stress overtaking member 25, with the other ring 26c being positioned on the radially external periphery thereof.

As mentioned above, the part 28 is made of a metallic material, for instance steel, and is intended to come to rest onto the surface 8b of the hub 8. The part 27 is made of a material having a low coefficient of friction, for instance a synthetic material, and is intended to come to rest onto the radially internal periphery of the turbine wheel 3.

The axial dimensions of the rings 26c, 26d are such that the two side parts 27, 28 are spaced by a distance d, which is sufficient to enable the axial compression of the deformable rings 26c, 26d.

In all the cases illustrated in FIGS. 1 to 6, with each part 26, 27, 28 may comprise notches 30 (FIGS. 2, 4 and 5) on the radially internal rim thereof, for instance four notches 30 regularly distributed on the periphery. Coupling lugs 31 (FIGS. 2 and 3) axially extend from the surface 8b of the hub 8 and are inserted into said notches 30 so as to provide a rotational coupling of the hub 8 and the stress overtaking member 25.

If the turbine wheel 3 is pushed frontwards, in operation, opposite the impeller wheel 2, such a motion is thus limited by the turbine wheel 3 resting on the stress overtaking member 25. In such resting position, the stress overtaking member 25 is subjected to an axial compression stress F, which causes a deformation or a compression C of the stress overtaking member 25, specifically of the elastomeric central part 26 thereof.

Figure 7:
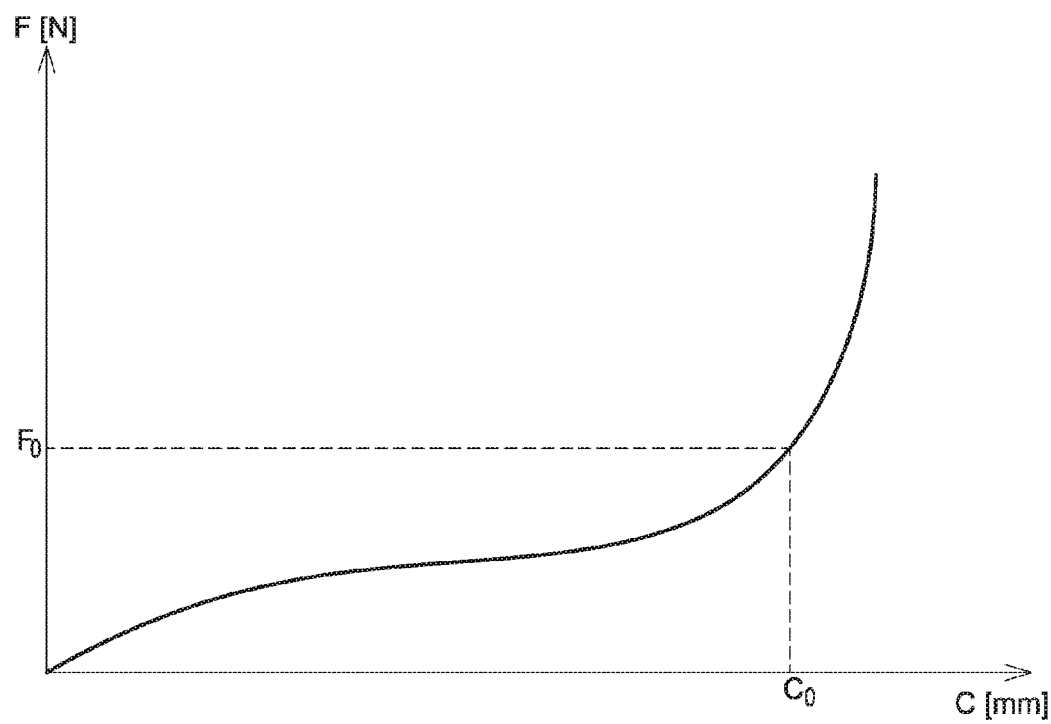
FIG. 7 is a diagram illustrating the variation in the compressive stress of the stress overtaking member according to the axial deformation thereof, FIG. 8 schematically shows a torque converter according to a second embodiment, FIG. 9 schematically shows a torque converter according to a third embodiment, FIG. 10 schematically shows a torque converter according to a fourth embodiment.

The diagram of FIG. 7 illustrates the variation in the stress F according to the deformation C.

The compression of the stress overtaking member 25 for a stress F0 globally corresponding to the maximum stress of compression of the stress overtaking member 25 when operated backwards is designated C0.

It can be noted that the slope of the curve is relatively flat below stress F0, with the slope being substantially steeper beyond such stress F0.

According to one embodiment illustrated in FIG. 7, at least one of the guiding washers 19, 20 for example may be provided with pendulum masses 32, movably mounted on the corresponding guiding washer 19, 20. The pendulum masses 32 are preferably positioned on a radially external zone of the corresponding guiding washer 19, 20.

Using such pendulum masses 34 is more particularly known from documents U.S. Ser. No. 14/305128, GB598811, U.S. Pat. No. 6,026,940 and EP1744074.

Figure 8:
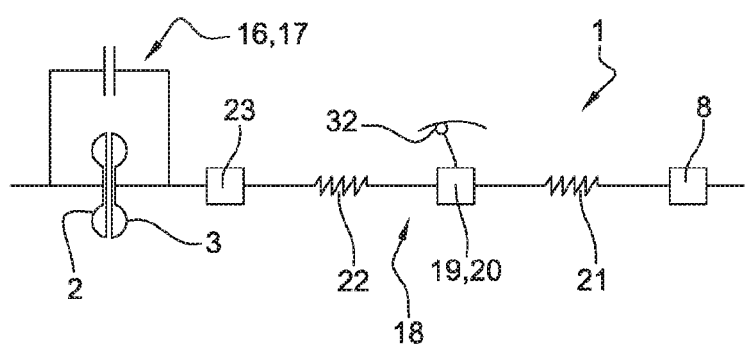

According to another embodiment illustrated in FIG. 8, at least one of the guiding washers 19, 20 may, for instance, be equipped with an inertial absorber, consisting of a mass 33 connected to one of the guiding washers 19, 20 by one elastic member 34 able to generate an elastic return torque on either side of a rest position. Using an inertial absorber is known more particularly from document WO2004/018897. The stiffness constant of such elastic member 34 may change or not, and the elastic member may consist of at least one coil spring, for instance.

Figure 9:
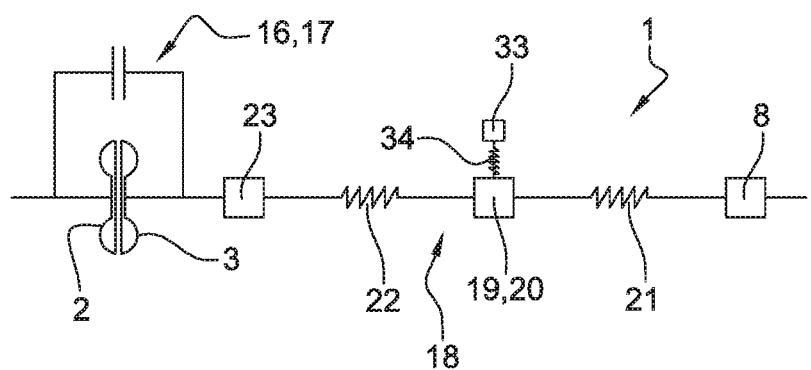
Figure 10:
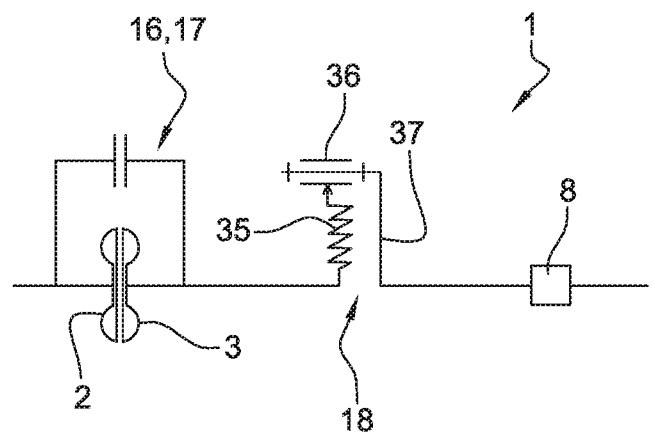

According to still another embodiment illustrated in FIG. 9, the damping device 18 may consist of at least one elastically deformable leaf 35 coupled to the turbine wheel 3 or to the hub 8 respectively, at least one bearing member 36 pivotally mounted on a support 37 coupled to the hub 8 or to the turbine wheel 3 respectively, with each leaf 35 being elastically held and radially resting on the corresponding bearing member 36 so as to bend upon rotation of the hub 8 relative to the turbine wheel 3.

Using such an elastic leaf is more particularly known from document FR3000155.

The invention claimed is:

1. A hydrokinetic torque coupling device (1) for a motor vehicle, the hydrokinetic torque coupling device (1) comprising:

an impeller wheel (2) intended to be coupled to a crankshaft;
a turbine wheel (3) hydrokinetically driven by the impeller wheel (2);
a cover non-rotatably coupled to the impeller wheel (2); and
an elastically deformable member (25) disposed axially between the turbine wheel (3) and a part (12) of the cover (5), the elastically deformable member (25) comprising an elastomeric part (26) made of an elastomer;
the cover (5) accommodating, at least partially, the turbine wheel (3) and a reactor (4);
the turbine wheel (3) being axially moveable between an engaged position in which the turbine wheel (3) and the impeller wheel (2) are non-rotatably coupled together, and a disengaged position in which the turbine wheel (3) and the impeller wheel (2) are rotationally uncoupled;
the elastically deformable member (25) configured to limit the axial displacement of the turbine wheel (3) towards the part (12) of the cover (5), opposite the turbine wheel (3).

2. The hydrokinetic torque coupling device (1) according to claim 1, further comprising a hub (8) configured to be coupled to a transmission input shaft, wherein the elastically deformable member (25) is disposed axially between the turbine wheel (3) and the hub (8) or between the hub (8) and the cover (5).

3. A hydrokinetic torque coupling device (1) for a motor vehicle, the hydrokinetic torque coupling device (1) comprising:

an impeller wheel (2) intended to be coupled to a crankshaft;
a turbine wheel (3) hydrokinetically driven by the impeller wheel (2);
a cover non-rotatably coupled to the impeller wheel (2); and
an elastically deformable member (25) disposed axially between the turbine wheel (3) and a part (12) of the cover (5);
the cover (5) accommodating, at least partially, the turbine wheel (3) and a reactor (4);
the turbine wheel (3) being axially moveable between an engaged position in which the turbine wheel (3) and the impeller wheel (2) are non-rotatably coupled together, and a disengaged position in which the turbine wheel (3) and the impeller wheel (2) are rotationally uncoupled;
the elastically deformable (25) configured to limit the axial displacement of the turbine wheel (3) towards the part (12) of the cover (5), opposite the turbine wheel (3);
the elastically deformable member (25) comprising a central deformable part (26) made of an elastically deformable material, and two side parts (27, 28) axially positioned on either side of the central deformable part (26), and wherein the parts (26, 27, 28) of the elastically deformable member (25) being drivingly coupled together.

4. The hydrokinetic torque coupling device (1) according to claim 3, wherein the central deformable part (26) and the side parts (27, 28) have an annular shape, with at least one of the side parts (27, 28) and the central deformable part (26) each comprising at least one annular protruding or respectively recessed zone (26b, 27b), embedded, in a form-fitting manner, in an annular protruding or respectively recessed zone (27b, 26b) of the other part (26, 27).

5. The hydrokinetic torque coupling device (1) according to claim 2, wherein one of the hub (8), the turbine wheel (3) and the cover (5) comprises a coupling lug (31) configured to be engaged into an opening or a notch (30) in the elastically deformable member (25) so as to rotationally drivingly couple the elastically deformable member (25), and one of the hub (8), the turbine wheel (3) and the cover (5).

6. The hydrokinetic torque coupling device (1) according to claim 2, further comprising a damping device (18) mounted between the turbine wheel (3) and the hub (8).

7. The hydrokinetic torque coupling device (1) according to claim 6, wherein the damping device (18) comprise an annular wheel disc (9) connected to the hub (8) and at least one guiding washer (19, 20) connected to the turbine wheel (3), with at least a first circumferentially acting elastic member (21) being mounted between the annular wheel disc (9) and the guiding washer (19, 20), with the first elastic member (21) being able to oppose the relative rotation of the annular wheel disc (9) relative to the guiding washer (19, 20).

8. The hydrokinetic torque coupling device (1) according to claim 7, wherein the damping device (18) comprise at least a second elastic member (22) mounted between the guiding washer (19, 20) and the turbine wheel (3), with the second elastic member (22) being able to oppose the relative rotation of the turbine wheel (3) relative to the guiding washer (19, 20).

9. A hydrokinetic torque coupling device (1) for a motor vehicle, the hydrokinetic torque coupling device (1) comprising:
an impeller wheel (2) intended to be coupled to a crankshaft;
a turbine wheel (3) hydrokinetically driven by the impeller wheel (2);
a cover non-rotatably coupled to the impeller wheel (2);
an elastically deformable member (25) disposed axially between the turbine wheel (3) and a part (12) of the cover (5); and
a hub (8) adapted to be coupled to a transmission input shaft;
the cover (5) accommodating, at least partially, the turbine wheel (3) and a reactor (4);
the turbine wheel (3) being axially moveable between an engaged position in which the turbine wheel (3) and the impeller wheel (2) are non-rotatably coupled together, and a disengaged position in which the turbine wheel (3) and the impeller wheel (2) are rotationally uncoupled;
the elastically deformable member (25) configured to limit the axial displacement of the turbine wheel (3) towards the part (12) of the cover (5), opposite the turbine wheel (3);
the elastically deformable member (25) comprising an elastomeric part (26) and being disposed axially between the turbine wheel (3) and the hub (8) or between the hub (8) and the cover (5).

10. The hydrokinetic torque coupling device (1) according to claim 1, wherein the elastically deformable member (25) comprises a central deformable part (26) in the form of the elastomeric part (26), and two side parts (27, 28) axially positioned on either side of the central deformable part (26), and wherein the parts (26, 27, 28) of the elastically deformable member (25) are rotationally drivingly coupled together.

11. The hydrokinetic torque coupling device (1) according to claim 2, wherein the elastically deformable member (25) comprises a central deformable part (26) in the form of the elastomeric part (26), and two side parts (27, 28) axially positioned on either side of the central deformable part (26), and wherein the parts (26, 27, 28) of the elastically deformable member (25) being rotationally drivingly coupled together.

12. The hydrokinetic torque coupling device (1) according to claim 3, wherein one of the hub (8), the turbine wheel (3) and the cover (5) comprises a coupling lug (31) configured to be engaged into an opening or a notch (30) in the elastically deformable member (25) so as to rotationally drivingly couple the elastically deformable member (25), and one of the hub (8), the turbine wheel (3) and the cover (5).

13. The hydrokinetic torque coupling device (1) according to claim 4, wherein one of the hub (8), the turbine wheel (3) and the cover (5) comprises a coupling lug (31) configured to be engaged into an opening or a notch (30) in the elastically deformable member (25) so as to rotationally drivingly couple the elastically deformable member (25), and one of the hub (8), the turbine wheel (3) and the cover (5).

14. The hydrokinetic torque coupling device (1) according to claim 3, comprising a damping device (18) mounted between the turbine wheel (3) and the hub (8).

15. The hydrokinetic torque coupling device (1) according to claim 4, comprising a damping device (18) mounted between the turbine wheel (3) and the hub (8).

16. The hydrokinetic torque coupling device (1) according to claim 5, comprising a damping device (18) mounted between the turbine wheel (3) and the hub (8).

* * * * *